(12) United States Patent
Kim et al.

(10) Patent No.: US 9,794,813 B2
(45) Date of Patent: Oct. 17, 2017

(54) METHOD FOR MEASURING INTERFERENCE OF NEIGHBORING BASE STATION IN WIRELESS COMMUNICATION SYSTEM AND METHOD FOR SUPPORTING INTERFERENCE MEASUREMENT

(71) Applicant: LG ELECTRONICS INC., Seoul (KR)

(72) Inventors: Hyungtae Kim, Anyang-si (KR); Jonghyun Park, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 239 days.

(21) Appl. No.: 14/426,077

(22) PCT Filed: Sep. 4, 2013

(86) PCT No.: PCT/KR2013/007971
§ 371 (c)(1),
(2) Date: Mar. 4, 2015

(87) PCT Pub. No.: WO2014/038842
PCT Pub. Date: Mar. 13, 2014

(65) Prior Publication Data
US 2015/0223086 A1     Aug. 6, 2015

Related U.S. Application Data

(60) Provisional application No. 61/696,784, filed on Sep. 4, 2012.

(51) Int. Cl.
*H04W 24/08*    (2009.01)
*H04B 17/309*   (2015.01)
(Continued)

(52) U.S. Cl.
CPC .......... *H04W 24/08* (2013.01); *H04B 17/309* (2015.01); *H04B 17/345* (2015.01);
(Continued)

(58) Field of Classification Search
None
See application file for complete search history.

(56) References Cited

U.S. PATENT DOCUMENTS 9,374,131 B2 *  6/2016  Chen .................... H04B 1/7143
2012/0057480 A1  3/2012  Yoo et al.
(Continued)

FOREIGN PATENT DOCUMENTS

| KR | 10-2010-0112329 | 10/2010 |
| KR | 10-2011-0097623 | 8/2011 |
| WO | 2011/161539 | 12/2011 |

OTHER PUBLICATIONS

PCT International Application No. PCT/KR2013/007971, Written Opinion of the International Authority dated Dec. 12, 2013, 16 pages.
(Continued)

*Primary Examiner* — Peter Chau
(74) *Attorney, Agent, or Firm* — Lee Hong Degerman Kang Waimey

(57) ABSTRACT

The present invention relates to a wireless communication system. A method by which a terminal measures the interference of a neighboring base station in a wireless communication system, according to one embodiment of the present invention, can comprise the steps of: determining a first resource group and a second resource group, which respectively include resource elements of X number of zero-power channel state information reference signals (CSI-RS) for measuring interference; respectively selecting T (Y≤X) number of resource elements in the first resource group and
(Continued)

the second resource group; and measuring the interference of a neighboring base station on the basis of the locations of the selected 2Y number of resource elements.

10 Claims, 10 Drawing Sheets

(51) Int. Cl.
    *H04B 17/345*     (2015.01)
    *H04L 5/00*     (2006.01)
    *H04W 72/08*     (2009.01)

(52) U.S. Cl.
    CPC ......... *H04L 5/0048* (2013.01); *H04W 72/082* (2013.01); *H04L 5/0012* (2013.01); *H04L 5/0073* (2013.01)

(56) References Cited

U.S. PATENT DOCUMENTS

| | | | |
|---|---|---|---|
| 2012/0087261 A1 | 4/2012 | Yoo et al. | |
| 2012/0213261 A1 | 8/2012 | Sayana et al. | |
| 2013/0208604 A1* | 8/2013 | Lee .................. | H04L 25/0226 370/252 |
| 2014/0036796 A1* | 2/2014 | Etemad ............. | H04W 24/04 370/329 |
| 2014/0036809 A1* | 2/2014 | Xu ..................... | H04W 52/54 370/329 |

OTHER PUBLICATIONS

Korean Intellectual Property Office Application Serial No. 10-2015-7008762, Notice of Allowance dated Feb. 2, 2016, 2 pages.

* cited by examiner

FIG. 5
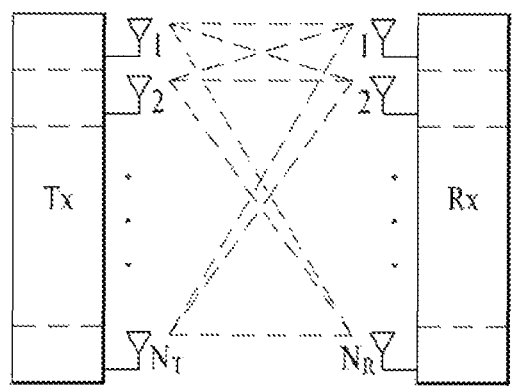
(a)
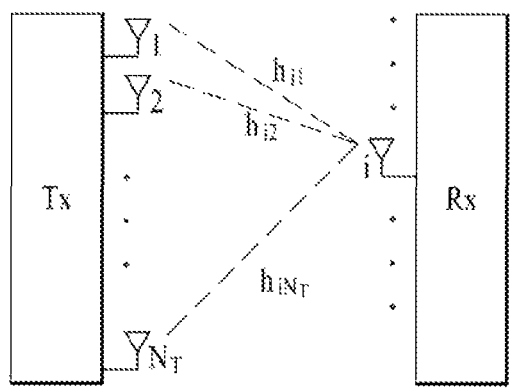
(b)

METHOD FOR MEASURING INTERFERENCE OF NEIGHBORING BASE STATION IN WIRELESS COMMUNICATION SYSTEM AND METHOD FOR SUPPORTING INTERFERENCE MEASUREMENT

CROSS-REFERENCE TO RELATED APPLICATIONS

This application is the National Stage filing under 35 U.S.C. 371 of International Application No. PCT/KR2013/007971, filed on Sep. 4, 2013, which claims the benefit of U.S. Provisional Application Ser. No. 61/696,784, filed on Sep. 4, 2012, the contents of which are hereby incorporated by reference herein in their entirety.

TECHNICAL FIELD

The present invention relates to a wireless communication system, and more particularly, to a method of determining a first resource group and a second resource group respectively including a resource element of a zero-power channel state information reference signal for interference measurement, a method of specifying interference of a neighboring base station by respectively selecting a resource element from the first resource group and the second resource group and a method of supporting interference measurement.

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Research on coordinated multi-point (CoMP) for improving throughput of a UE located at a cell boundary by applying improved MIMO to a multi-cell environment is actively performed. The CoMP system can decrease inter-cell interference in a multi-cell environment and improve system performance.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-pre-coded channel information. Accordingly, a receiver of a system according to LTE-A standard can define a RS for acquisition of channel state information (CSI), that is, CSI-RS.

DISCLOSURE OF THE INVENTION

Technical Task

An object of the present invention devised to solve the problem lies in a method and apparatus for reporting channel state information in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of measuring interference of a neighboring base station, which is measured by a user equipment in a wireless communication system, can include the steps of determining a first resource group and a second resource group respectively including resource elements of the X number of zero power channel state information reference signals for interference measurement, selecting the Y (Y≤X) number of resource elements from the first resource group and the second resource group, respectively, and measuring the interference of the neighboring base station based on a position of the 2Y number of selected resource elements.

The selecting step calculates an index using a pseudo-random sequence and can select the Y number of resource elements from the first resource group and the second resource group, respectively, according to the index.

The X corresponds to 4, the Y corresponds to 2 and the selecting step can calculate the index by applying Formula A in the following to the first resource group and the second resource group, respectively.

$$P_{hop}^{j}(i) = \left( P_{hop}^{j}(i-1) + \left( \sum_{k=i\cdot N+1}^{i\cdot N+O} c(k) \times 2^{k-(i\cdot N+1)} \right) \bmod(R-1) + 1 \right) \bmod R \quad \text{[Formula A]}$$

In this case, i corresponds to a resource block index, j corresponds to a resource group index, c(k) corresponds to a pseudo-random sequence, $P_{hop}^j$ corresponds to a hopping pattern index of a (j+1) group, mod corresponds to modular calculation, R corresponds to 6, N corresponds to 10, and O corresponds to 9.

The X corresponds to 4, the Y corresponds to 2 and the selecting step can calculate a first index by applying Formula A in the following to the first resource group and calculate a second index by applying Formula B in the following to the second resource group.

$$P_{hop}^j(i) = \qquad\qquad\qquad\qquad\qquad\qquad\text{[Formula A]}$$
$$\left(P_{hop}^j(i-1) + \left(\sum_{k=i\cdot N+1}^{i\cdot N+O} c(k) \times 2^{k-(i\cdot N+1)}\right) \mod(R-1) + 1\right) \mod R$$

$$P_{hop}^1(i) = (P_{hop}^0(i) + \Delta) \mod R \qquad\qquad \text{[Formula B]}$$

In this case, i corresponds to a resource block index, j corresponds to a resource group index, c(k) corresponds to a pseudo-random sequence, $P_{hop}^j$ corresponds to a hopping pattern index of a (j+1) group, mod corresponds to modular calculation, R corresponds to 6, N corresponds to 10, O corresponds to 9, and $\Delta$ corresponds to an offset value.

The X corresponds to 4, the Y corresponds to 2 and the selecting step can calculate the index by applying Formula C in the following to the first resource group and the second resource group.

$$P_{hop}(i) = \qquad\qquad\qquad\qquad\qquad\qquad\text{[Formula C]}$$
$$\left(P_{hop}(i-1) + \left(\sum_{k=i\cdot N+1}^{i\cdot N+O} c(k) \times 2^{k-(i\cdot N+1)}\right) \mod(R-1) + 1\right) \mod R$$

In this case, i corresponds to a resource block index, j corresponds to a resource group index, c(k) corresponds to a pseudo-random sequence, $P_{hop}^j$ corresponds to a hopping pattern index of a (j+1) group, mod corresponds to modular calculation, R corresponds to 36, N corresponds to 10, and O corresponds to 9.

The method can further includes the step of selecting 4 resource elements by applying Formula D in the following to a dependent resource block associated with a resource block including the selected 4 resource elements.

$$P_{hop}^j(i) = (P_{hop}^j + \Delta(i)) \mod R \qquad\qquad \text{[Formula D]}$$

In this case, i corresponds to a resource block index, j corresponds to a resource group index, mod corresponds to modular calculation, R corresponds to 6, and $\Delta(i)$ corresponds to an offset value applied to an $i^{th}$ resource block.

The method can further include the step of selecting 4 resource elements by applying Formula E in the following to a dependent resource block associated with a resource block including the selected 4 resource elements.

$$P_{hop}^j(i) = \qquad\qquad\qquad\qquad\qquad\qquad\text{[Formula E]}$$
$$\left(P_{hop}^j(i-1) + \left(\sum_{k=i\cdot N+1}^{i\cdot N+O} c(k) \times 2^{k-(i\cdot N+1)}\right) \mod(R-1) + 1\right) \mod R$$

In this case, i corresponds to a resource block index, j corresponds to a resource group index, c(k) corresponds to a pseudo-random sequence, $P_{hop}^j$ corresponds to a hopping pattern index of a (j+1) group, mod corresponds to modular calculation, R corresponds to $6^M$, M corresponds to sum of the number of dependent resource blocks, N corresponds to 10, and O corresponds to 9.

To further achieve these and other advantages and in accordance with the purpose of the present invention, according to a different embodiment, a method of supporting interference measurement, which is supported by a base station in a wireless communication system, can include the steps of determining a first resource group and a second resource group respectively including resource elements of the X number of zero power channel state information reference signals for interference measurement, selecting the Y (Y≤X) number of resource elements from the first resource group and the second resource group, respectively, and performing muting in the 2Y number of selected resource elements.

The selecting step calculates an index using a pseudo-random sequence and can select the Y number of resource elements from the first resource group and the second resource group, respectively, according to the index.

The X corresponds to 4, the Y corresponds to 2 and the selecting step can calculate the index by applying Formula A in the following to the first resource group and the second resource group, respectively.

$$P_{hop}^j(i) = \qquad\qquad\qquad\qquad\qquad\qquad\text{[Formula A]}$$
$$\left(P_{hop}^j(i-1) + \left(\sum_{k=i\cdot N+1}^{i\cdot N+O} c(k) \times 2^{k-(i\cdot N+1)}\right) \mod(R-1) + 1\right) \mod R$$

In this case, i corresponds to a resource block index, j corresponds to a resource group index, c(k) corresponds to a pseudo-random sequence, $P_{hop}^j$ corresponds to a hopping pattern index of a (j+1) group, mod corresponds to modular calculation, R corresponds to 6, N corresponds to 10, and O corresponds to 9.

The X corresponds to 4, the Y corresponds to 2 and the selecting step calculates a first index by applying Formula A in the following to the first resource group and can calculate a second index by applying Formula B in the following to the second resource group.

$$P_{hop}^j(i) = \qquad\qquad\qquad\qquad\qquad\qquad\text{[Formula A]}$$
$$\left(P_{hop}^j(i-1) + \left(\sum_{k=i\cdot N+1}^{i\cdot N+O} c(k) \times 2^{k-(i\cdot N+1)}\right) \mod(R-1) + 1\right) \mod R$$

$$P_{hop}^1(i) = (P_{hop}^0(i) + \Delta) \mod R \qquad\qquad \text{[Formula B]}$$

In this case, i corresponds to a resource block index, j corresponds to a resource group index, c(k) corresponds to a pseudo-random sequence, $P_{hop}^j$ corresponds to a hopping pattern index of a (j+1) group, mod corresponds to modular calculation, R corresponds to 6, N corresponds to 10, O corresponds to 9, and $\Delta$ corresponds to an offset value.

The X corresponds to 4, the Y corresponds to 2 and the selecting step can calculate the index by applying Formula C in the following to the first resource group and the second resource group.

$$P_{hop}(i) = \left( P_{hop}(i-1) + \left( \sum_{k=i\cdot N+1}^{i\cdot N+O} c(k) \times 2^{k-(i\cdot N+1)} \right) \mod(R-1) + 1 \right) \mod R \quad \text{[Formula C]}$$

In this case, i corresponds to a resource block index, j corresponds to a resource group index, c(k) corresponds to a pseudo-random sequence, $P_{hop}^{j}$ corresponds to a hopping pattern index of a (j+1) group, mod corresponds to modular calculation, R corresponds to 36, N corresponds to 10, and O corresponds to 9.

The method can further include the step of selecting 4 resource elements by applying Formula D in the following to a dependent resource block associated with a resource block including the selected 4 resource elements.

$$P_{hop}^{j}(i) = (P_{hop}^{j} + \Delta(i)) \mod R \quad \text{[Formula D]}$$

In this case, i corresponds to a resource block index, j corresponds to a resource group index, mod corresponds to modular calculation, R corresponds to 6, and $\Delta(i)$ corresponds to an offset value applied to an $i^{th}$ resource block.

The method can further include the step of selecting 4 resource elements by applying Formula E in the following to a dependent resource block associated with a resource block including the selected 4 resource elements.

$$P_{hop}^{j}(i) = \left( P_{hop}^{j}(i-1) + \left( \sum_{k=i\cdot N+1}^{i\cdot N+O} c(k) \times 2^{k-(i\cdot N+1)} \right) \mod(R-1) + 1 \right) \mod R \quad \text{[Formula E]}$$

In this case, i corresponds to a resource block index, j corresponds to a resource group index, c(k) corresponds to a pseudo-random sequence, $P_{hop}^{j}$ corresponds to a hopping pattern index of a (j+1) group, mod corresponds to modular calculation, R corresponds to $6^M$, M corresponds to sum of the number of dependent resource blocks, N corresponds to 10, and O corresponds to 9.

It is to be understood that both the foregoing general description and the following detailed description are exemplary and explanatory and are intended to provide further explanation of the invention as claimed.

Advantageous Effects

According to embodiment of the present invention, it may be able to more efficiently perform interference measurement of a neighboring base station in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a configuration diagram for a wireless communication system including multiple antennas;

BEST MODE

Mode for Invention

Figure 1:
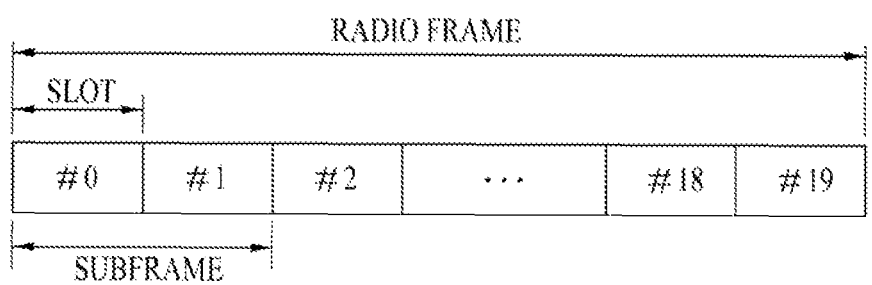
FIG. 1 is a diagram for a structure of a downlink radio frame.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "relay" may be replaced with the terms relay node (RN) or relay station (RS). The term "terminal" may also be replaced with a user equipment (UE), a mobile station (MS), a mobile subscriber station (MSS) or a subscriber station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
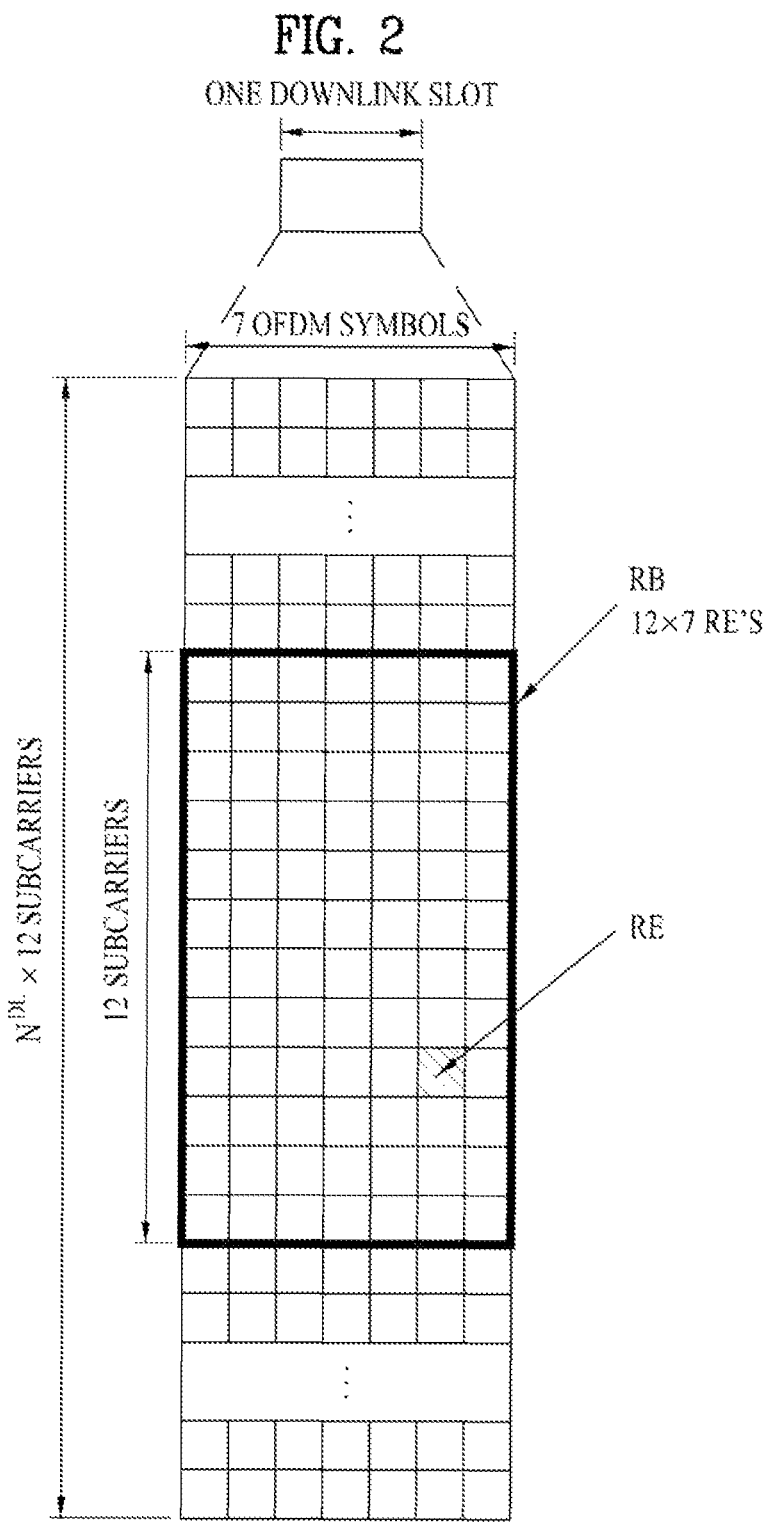
FIG. 2 is a diagram for one example of a resource grid for a downlink slot.

FIG. 2 illustrates the structure of a downlink resource grid for the duration of one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a $k_{th}$ subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. $N^{DL}$ is number of RBs in a downlink slot. $N^{DL}$ depends on a downlink transmission bandwidth configured by BS scheduling.

Figure 3:
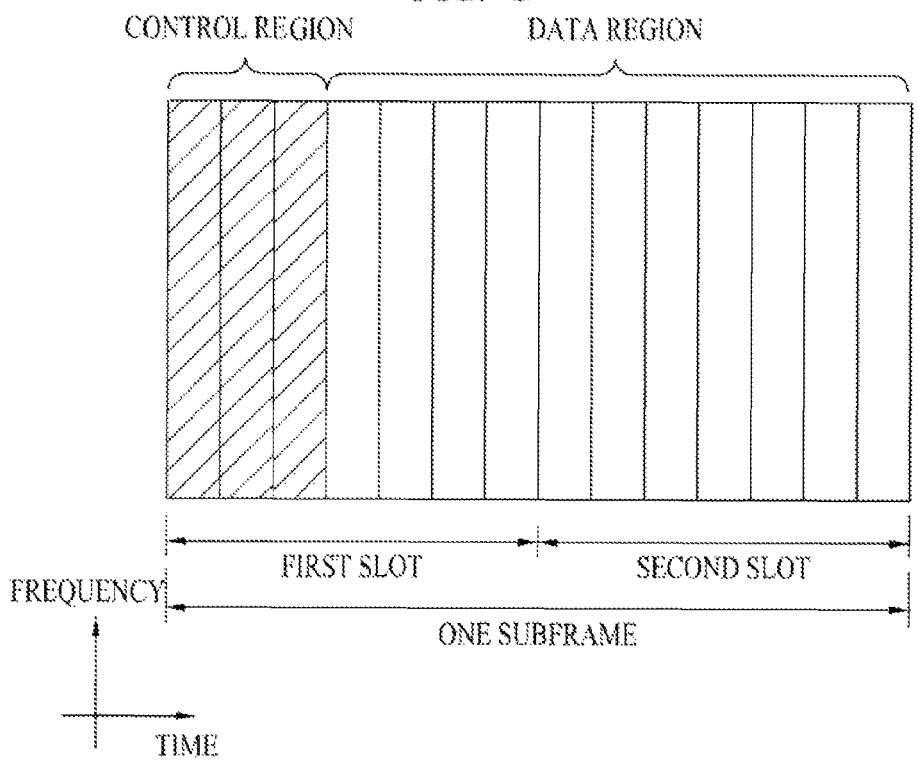
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
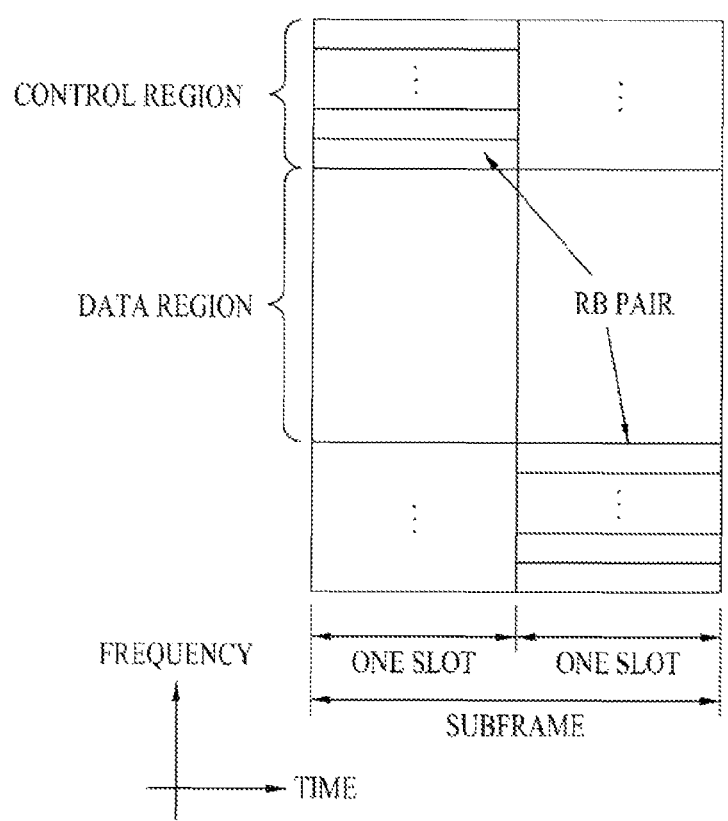
FIG. 4 is a diagram for a structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO System

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates the configuration of a MIMO communication system having multiple antennas. As illustrated in FIG. 5(a), the simultaneous use of a plurality of antennas at both the transmitter and the receiver increases a theoretical channel transmission capacity, compared to use of a plurality of antennas at only one of the transmitter and the receiver. Therefore, transmission rate may be increased and frequency efficiency may be remarkably increased. As channel transmission rate is increased, transmission rate may be increased, in theory, to the product of a maximum transmission rate $R_o$ that may be achieved with a single antenna and a transmission rate increase Ri.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that $N_T$ Tx antennas and $N_R$ Rx antennas are present in the system.

Regarding a transmission signal, up to $N_T$ pieces of information can be transmitted through the $N_T$ Tx antennas, as expressed in Equation 2 below.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} \qquad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Here, $W_{ij}$ refers to a weight between an $i_{th}$ Tx antenna and $j_{th}$ information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector (s) have different values. In the case of spatial diversity, the same signal is repeatedly transmitted through a plurality of channel paths and thus elements of information vectors (s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of $N_R$ Rx antennas, a reception signal of each antenna may be expressed as the vector shown in Equation 6 below.

$$y = [y_1, y_2, \ldots, y_{N_R}]^T \qquad \text{[Equation 6]}$$

When a channel modeling is executed in the MIMO communication system, individual channels can be distinguished from each other according to transmission/reception (Tx/Rx) antenna indexes. A channel passing the range from a Tx antenna j to an Rx antenna i is denoted by $h_{ij}$. It should be noted that the index order of the channel $h_{ij}$ is located before a reception (Rx) antenna index and is located after a transmission (Tx) antenna index.

FIG. 5(b) illustrates channels from $N_T$ Tx antennas to an Rx antenna i. The channels may be collectively represented in the form of vector and matrix. Referring to FIG. 5(b), the channels passing the range from the $N_T$ Tx antennas to the Rx antenna i can be represented by the Equation 7 below.

$$h_i^T = [h_{i1}, h_{i2}, \ldots, h_{iN_T}] \qquad \text{[Equation 7]}$$

All channels passing the range from the $N_T$ Tx antennas to $N_R$ Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} \qquad \text{[Equation 8]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix}$$

Additive white Gaussian noise (AWGN) is added to an actual channel which has passed the channel matrix. The AWGN ($n_1, n_2, \ldots, n_{N_R}$) added to each of $N_R$ reception (Rx) antennas can be represented by Equation 9 below.

$$n = [n_1, n_2, \ldots, n_{N_R}]^T \qquad \text{[Equation 9]}$$

A reception signal calculated by the above-mentioned equations can be represented by Equation 10 below.

$$y = \begin{bmatrix} y_1 \\ y_2 \\ \vdots \\ y_i \\ \vdots \\ y_{N_R} \end{bmatrix} \qquad \text{[Equation 10]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

The number of rows and the number of columns of a channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

$$\text{rank}(H) \leq \min(N_T, N_R) \qquad \text{[Equation 11]}$$

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
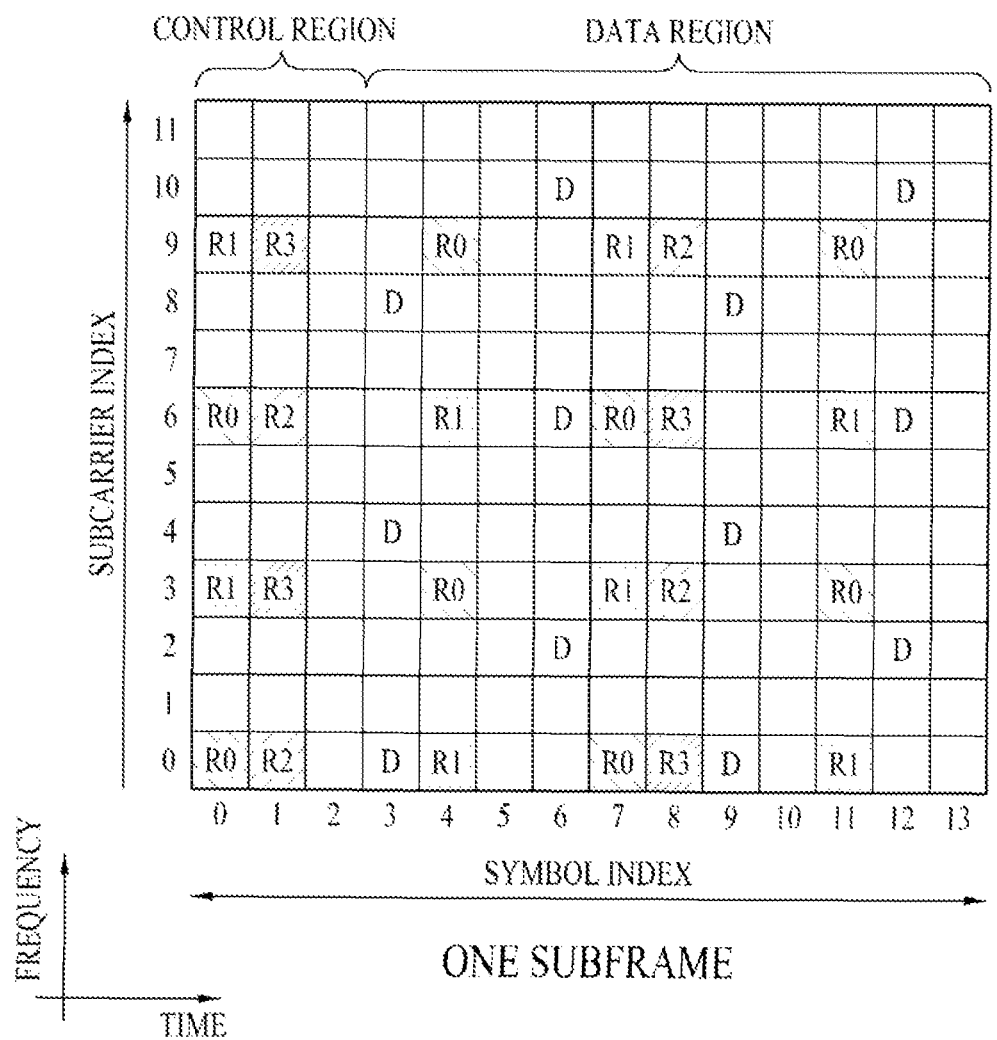
FIG. 6 is a diagram for a legacy pattern of a CRS and a DRS.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
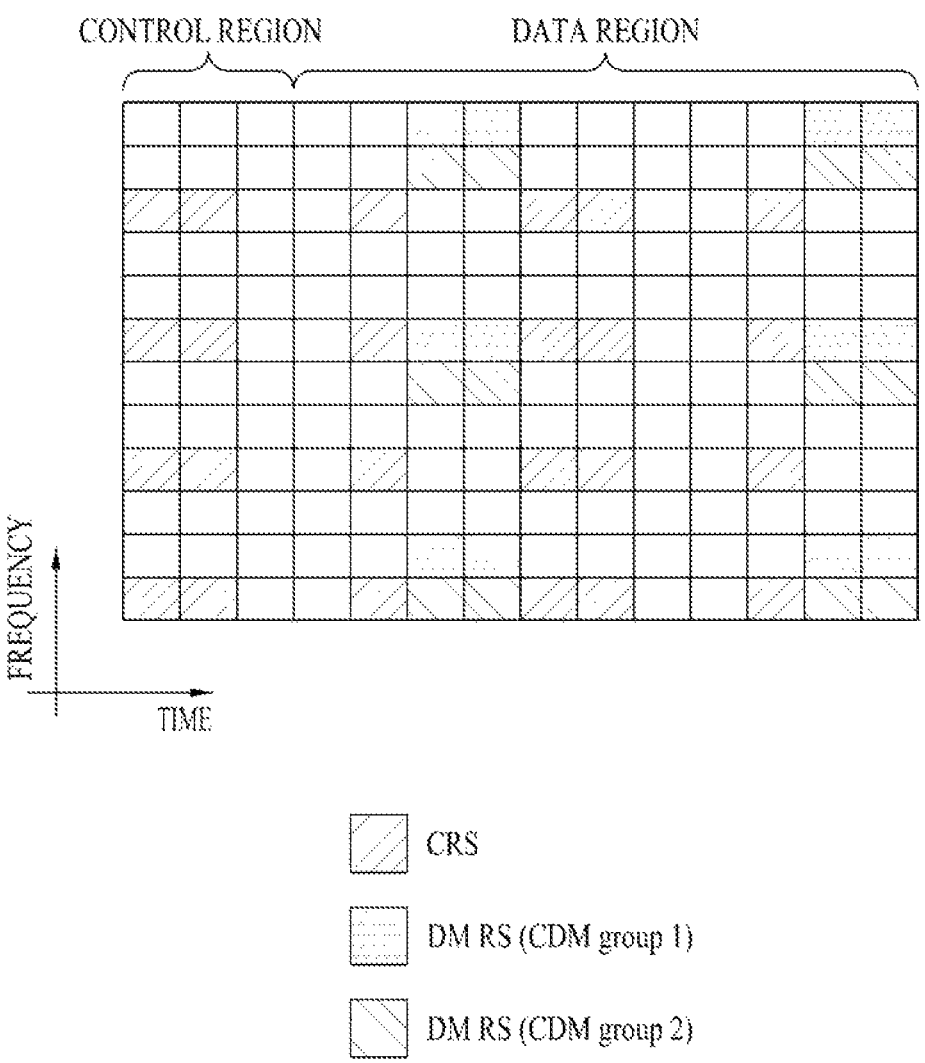
FIG. 7 is a diagram for an example of a DM RS pattern.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
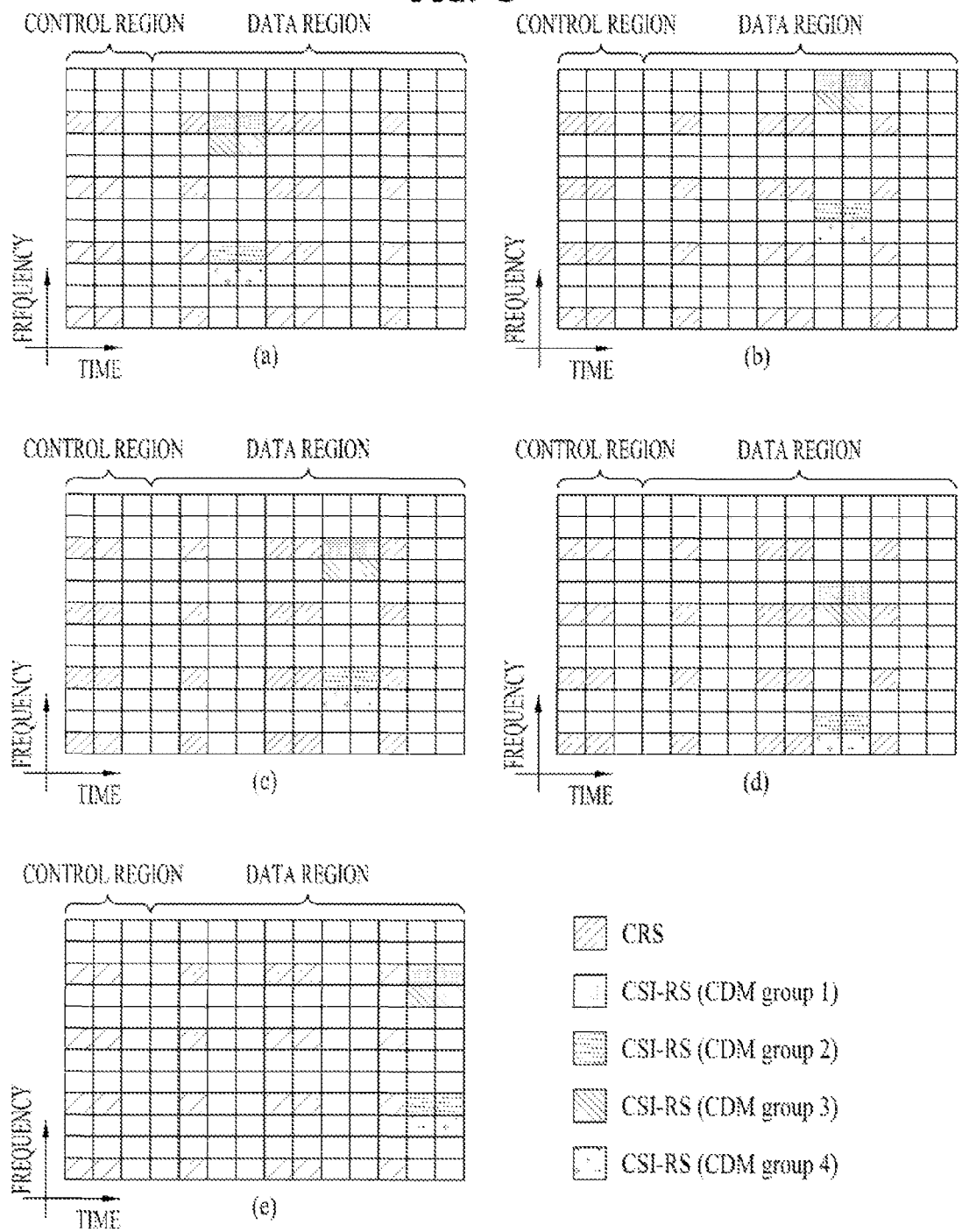
FIG. 8 is a diagram for examples of a CSI-RS pattern.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(*a*) is applicable to the CSI-RS patterns illustrated in FIGS. 8(*b*) to 8(*e*).

The RS patterns illustrated in FIGS. 6, 7 and 8 are purely exemplary. Thus it should be clearly understood that various embodiments of the present invention are not limited to specific RS patterns. That is, various embodiments of the present invention can also be implemented in the same manner when other RS patterns than those illustrated in FIGS. 6, 7 and 8 are applied.

Meanwhile, a sequence for a reference signal can be generated using a pseudo random sequence generator.

A pseudo random sequence is defined by a gold sequence of length 31. An output sequence C(n) of length $M_{PN}$ can be defined by Formula 12 in the following (In this case, n=0, 1, ..., $M_{PN}$−1).

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Formula 12]}$$

In this case, $N_c$ corresponds to 1600 and a first m-sequence is initialized as $x_1(0)=1$, $x_1(n)=0$, n=1, 2, ..., 30.

Initialization of a second m-sequence can be represented as $c_{init}=\Sigma_{i=0}^{30} x_2(i) \cdot 2^i$, which has a value according to a value in accordance with an application of a sequence. In this case, $x_1(i)$ corresponds to a first m-sequence of a gold sequence generator and $x_2(i)$ corresponds to a second m-sequence of the gold sequence generator.

Cooperative Multi-Point (CoMP)

According to an improved system performance requirement of a 3GPP LTE-A system, a CoMP transmission/reception technology MIMO (also represented as a co-MIMO, a collaborative MIMO, a network MIMO, or the like) is proposed. The CoMP technology increases the performance of a user equipment situating at a cell edge and can increase an average sector throughput.

In general, in a multi-cell environment where a frequency reuse factor corresponds to 1, the performance of a user equipment situating at a cell boundary and the average sector throughput can be reduced due to inter-cell interference (ICI). In order to reduce the ICI, a legacy LTE system applied a method for enabling the user equipment situating at a cell boundary to have an appropriate throughput performance using such a simple passive scheme as a fractional frequency reuse (FFR) via a UE-specific power control in an environment limited by the interference. Yet, it may be more preferable to reduce the ICI or reuse the ICI as a signal preferred by the user equipment than to lower the use of a frequency resource per cell. In order to achieve the aforementioned purpose, CoMP transmission scheme can be applied.

The CoMP scheme applicable in DL can be largely classified into a joint processing (JP) scheme and a coordinated scheduling/beamforming (CS/CB) scheme.

The JP scheme can use a data in each point (base station) of a CoMP cooperative unit. The CoMP cooperative unit means a set of base stations used for a cooperative transmission scheme. The JP scheme can be classified into a joint transmission scheme and a dynamic cell selection scheme.

The joint transmission scheme indicates a scheme transmitting PDSCH from a plurality of points (a part or entire CoMP cooperative units) at a time. In particular, the data transmitted to single user equipment can be simultaneously transmitted from a plurality of transmission points. According to the joint transmission scheme, quality of a reception signal can be coherently or non-coherently enhanced. And, interference for a different user equipment can be actively eliminated.

The dynamic cell selection scheme indicates a scheme transmitting PDSCH from a point (of a CoMP cooperative unit) at a time. In particular, a data transmitted to single user equipment on a specific timing point is transmitted from one point. A different point within the cooperative unit does not transmit a data to the corresponding user equipment on the specific timing point. The point transmitting the data to the corresponding user equipment can be dynamically selected.

Meanwhile, according to CS/CB scheme, the CoMP cooperative units can cooperatively perform a beamforming of data transmission for single user equipment. In this case, although the data is transmitted from a serving cell only, a user scheduling/beamforming can be determined by a coordination of cells in a corresponding CoMP cooperative unit.

Meanwhile, in case of UL, a coordinated multi-point reception means to receive a signal transmitted by coordination of a plurality of points, which are geographically apart from each other. The CoMP scheme applicable in UL can be classified into a joint reception (JR) and the coordinated scheduling/beamforming (CS/CB).

The JR scheme means that a signal transmitted on PUSCH is received by a plurality of receiving points. The CS/CB scheme means that PUSCH is received at one point and a user scheduling/beamforming is determined by coordination of cells in a CoMP cooperative unit.

Method of Determining IMR (Interference Measurement Resource) Hopping Pattern

In order to perform CoMP scheduling in a network, a user equipment should feedback not only DL CSI information of a serving cell but also DL CSI information of a neighboring cell participating in CoMP. To this end, the user equipment provides feedback on a plurality of CSI processes to which a cell transmitting various data and various interference environments are reflected thereto.

Hence, in case of calculating CoMP CSI in LTE system, an IMR (interference measurement resource) is used to measure interference. A plurality of IMRs can be set to single user equipment. Each of a plurality of the IMRs can be independently configured. In particular, a period, an offset and a resource configuration are independently configured in each IMR. A base station can signal each IMR to a user equipment using upper layer signaling (e.g., RRC and the like).

Figure 9:
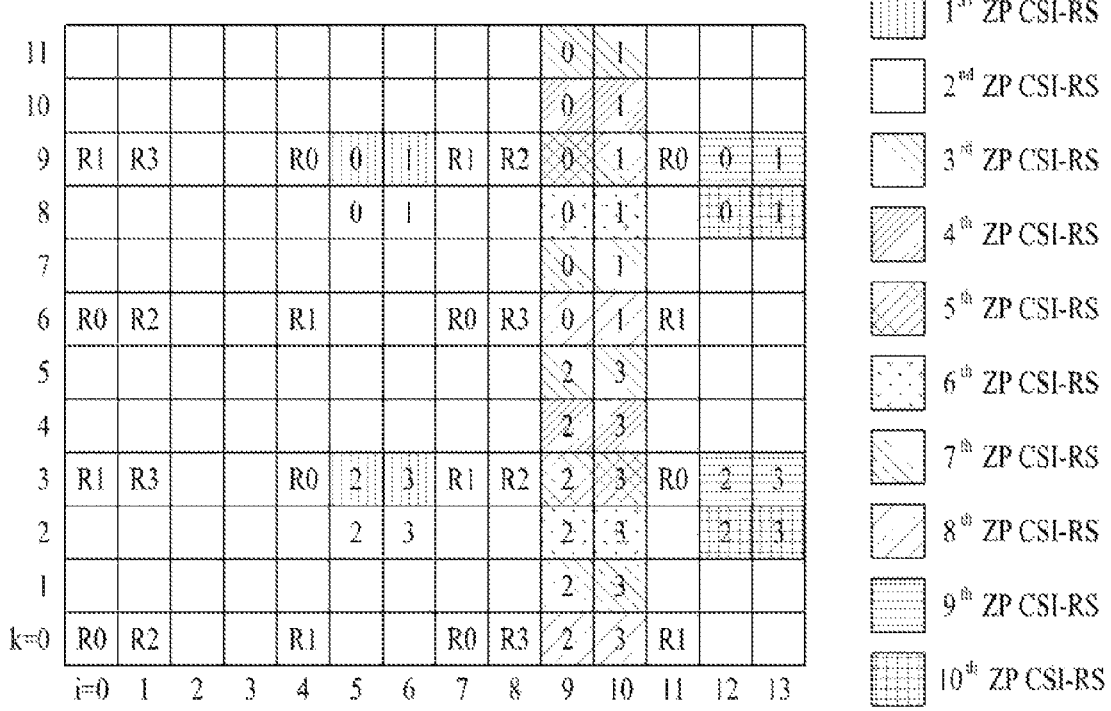
FIG. 9 is a diagram for an example of a zero-power channel state information reference signal pattern.

FIG. 9 is a diagram for an example of a downlink zero-power CSI-RS (channel state information reference signal) pattern. A base station mutes a CSI-RS resource element of a different base station to improve CSI-RS measurement performance of the different base station and enables a user equipment to efficiently perform rate matching. In this case, the base station configures the muted resource element as a ZP CSI-RS and informs a user equipment of the ZP CSI-RS.

As shown in an example of FIG. 9, an IMR is configured as a subset of a ZP CSI-RS resource element. In order to efficiently configure an IMR, it may use an IMR hopping pattern shown in an example of FIG. 10. The IMR hopping pattern can be determined according to procedures described in the following.

First of all, as shown in the example of FIG. 9, it may be able to select two ZP CSI-RS groups as a ZP CSI-RS bitmap from 10 ZP CSI-RS groups. The selected two ZP CSI-RS groups can be called a first resource group and a second resource group, respectively. Subsequently, two resource elements among 4 resource elements are randomly selected from the first resource group and two resource elements among 4 resource elements are randomly selected from the second resource group. Subsequently, the selected four resource elements are configured as an IMR.

Figure 10:
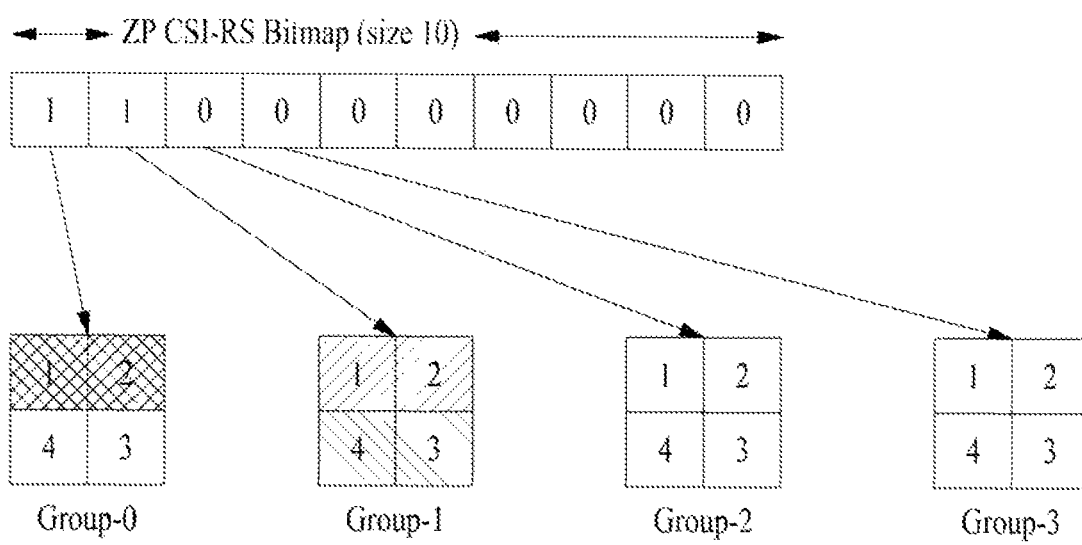
FIG. 10 is a diagram for an example of a hopping pattern of an interference measurement resource used for measuring interference of a neighboring base station.

FIG. 10 shows resource elements, i.e., IMRE-0 and IMRE-1, selected according to the aforementioned procedures. The IMRE-0 is generated in a manner of selecting a first resource element and a second resource element from a group 0 and selecting a first resource element and a second resource element from a group 1. The IMRE-1 is generated in a manner of selecting a first resource element and a second resource element from the group 0 and selecting a third resource element and a fourth resource element from a group 1.

In the first procedure of the method of configuring an IMR hopping pattern, a base station can inform a user equipment of two groups to which an IMR is transmitted via upper layer signaling such as RRC. Specifically, as shown in FIG. 10, the base station can designate two groups via a ZP CSI-RS bitmap. Or, the base station can designate two groups via 8 ports CSI-RS resource configuration for the user equipment. In this case, resource configuration of the two groups is always restricted by the 8-ports CSI-RS resource configuration. And, the user equipment and the base station can select two groups to which each IMR is transmitted using a predetermined method shared by the base station and the user equipment with each other.

In the second procedure of the method of configuring an IMR hopping pattern, the user equipment or the base station determines a position of an IMR resource element in a selected group. In particular, after the two groups are selected via the first procedure, a position of two resource elements is determined in each group.

In the following, embodiments of a method of determining an IMR hopping pattern, which determines a position of an IMR resource element, is explained. According to the embodiments of the present invention, a base station and a user equipment use a random function of which a PN code corresponds to a factor and may be able to control a range of a random number generated by the PN code in a manner of performing modular calculation with the number of available hopping patterns.

Embodiment 1

First embodiment corresponds to embodiment of independently determining an IMR hopping pattern for each resource block. In particular, according to the first embodiment, an IMR hopping pattern is independently determined for each resource block (RB) constructing a whole frequency band. Specifically, the first embodiment can determine an IMR hopping pattern using one of embodiment 1-1, embodiment 1-2 and embodiment 1-3 for each resource block.

Embodiment 1-1

Embodiment 1-1 corresponds to an embodiment of independently determining a hopping pattern for each of two groups constructing a single IMR in each resource block. All numbers of cases selecting 2 resource elements from 4 resource elements in a group corresponds to 6. Hence, indexes ranging from 0 to 5 are given to the 6 cases and 2 resource elements can be determined in each group using a random number between 0 and 5 generated by a specific function. In this case, as an example of the function generating the random number between 0 to 5, it may use Formula 13 in the following.

$$P_{hop}^{j}(i) = \left( P_{hop}^{j}(i-1) + \left( \sum_{k=i \cdot N+1}^{i \cdot N+O} c(k) \times 2^{k-(i \cdot N+1)} \right) \bmod(R-1) + 1 \right) \bmod R \quad \text{[Formula 13]}$$

In this case, i indicates a resource block index, c(k) indicates a PN code and $P_{hop}^{j}$ indicates a hopping pattern index of a (j+1) group. Since two groups are set to a single IMR, j is configured by either 0 or 1. A constant number R means the number of available hopping patterns. Since there exist 6 cases in the aforementioned example, R is set to 6. And, an initial value can be set to $P_{hop}(-1)=0$ or a base station can designate an initial value for a user equipment via such upper layer signaling as RRC and the like. N and O correspond a constant number. N and O can be set to 10 and 9, respectively.

A user equipment can determine a position of a resource element of an IMR using Formula 13 in response to a random resource block i. In particular, a position of a resource element of an IMR is determined using Formula 13 in response to each of two ZP CSI-RS resource groups and it may be able to measure interference.

Similarly, a base station can determine a position of a resource element of an IMR using Formula 13 in response to a random resource block i. In particular, a position of a resource element of an IMR is determined using Formula 13 in response to each of two ZP CSI-RS resource groups, which are allocated to the IMR, and muting is performed or data is transmitted in an IMR resource element.

In order for a user equipment and a base station to identically index a hopping pattern, the user equipment and the base station can share a table to which a hopping pattern and an index are mapped with each other. And, the user equipment and the base station can identically index a hopping pattern according to a determined algorithm without a separate sharing table.

Embodiment 1-2

Embodiment 1-2 corresponds to an embodiment of determining a hopping pattern dependent on two groups constructing a single IMR. In particular, instead of determining a position of a resource element of an IMR using Formula 13 in response to 2 ZP CSI-RS groups, it is able to determine a position of a resource element of an IMR dependent on 2 groups.

For instance, a user equipment can determine a position of an IMR resource element of a first group among two groups with the method of embodiment 1-1 using Formula 13. Subsequently, in case of determining a position of an IMR resource element of a second group, it may be able to determine the position of the resource element by adding an offset to a hopping pattern index of the first group. Subsequently, the user equipment can measure interference from a determined IMR.

Similarly, a base station determines a position of an IMR resource element of a first group using formula 13 and may be then able to determine a position of an IMR resource element of a second group using Formula 14 in the following. Subsequently, the base station can perform muting or transmit data in the IMR resource element.

$$P_{hop}^{1}(i) = (P_{hop}^{0}(i) + \Delta) \bmod R \quad \text{[Formula 14]}$$

Formula 14 uses modular calculation to change a value of which an offset is added to a hopping pattern index to a value belonging to a range of the hopping pattern index. And, in Formula 14, $P_{hop}^{0}(i)$ and $P_{hop}^{1}(i)$ correspond to a hopping pattern index of a first group and a hopping pattern index of a second group, respectively, constructing a single IMR in a resource block i. A constant number Δ corresponds to an offset value between the $P_{hop}^{0}(i)$ and the $P_{hop}^{1}(i)$. A base station can designate the constant number to a user equipment via upper layer signaling such as RRC signaling and the like. A constant number R means the number of available hopping patterns. Since there exist 6 cases in the aforementioned example, the R is set to 6.

In order for a user equipment and a base station to identically index a hopping pattern, the user equipment and the base station can share a table to which a hopping pattern and an index are mapped with each other. And, the user equipment and the base station can identically index a hopping pattern according to a determined algorithm without a separate sharing table.

Embodiment 1-3

Embodiment 1-3 corresponds to an embodiment of simultaneously determining a hopping pattern of two groups constructing a single IMR. In particular, it is able to determine a hopping pattern of two groups constructing a single IMR at the same time using a hopping pattern generator generating random numbers of a range relatively bigger than a range of the aforementioned embodiment. Since all numbers of cases determining an IMR of 4 resource elements by selecting 2 resource elements from each of the two groups correspond to 36, a user equipment and a base station set an R value of Formula 15 in the following to 36.

A user equipment generates a hopping pattern index $P_{hop}(i)$, which is applied to the two groups at the same time, using Formula 15 in the following. Subsequently, the user equipment measures interference from an IMR resource element, which is determined based on the hopping pattern index.

Similarly, a base station generates a hopping pattern index $P_{hop}(i)$, which is applied to the two groups at the same time, using Formula 15 in the following. Subsequently, the base station performs muting or transmits data in an IMR resource element, which is determined based on the hopping pattern index.

$$P_{hop}(i) = \left( P_{hop}(i-1) + \left( \sum_{k=i\cdot N+1}^{i\cdot N+O} c(k) \times 2^{k-(i\cdot N+1)} \right) \mod(R-1) + 1 \right) \mod R$$

[Formula 15]

In order for a user equipment and a base station to identically index 36 hopping patterns, the user equipment and the base station can share a table to which a hopping pattern and an index are mapped with each other. And, the user equipment and the base station can identically index a hopping pattern according to a determined algorithm without a separate sharing table.

An initial value can be set to $P_{hop}(-1)=0$ or a base station can designate an initial value for a user equipment via such upper layer signaling as RRC and the like. N and O correspond a constant number. N and O can be set to 10 and 9, respectively.

Meanwhile, in order to reduce implementation complexity of the embodiment 1, a user equipment and a base station may calculate a hopping pattern in response to $P_{hop}(0)$ or $P_{hop}^{0}(0)$ and $P_{hop}^{1}(0)$. Subsequently, the user equipment and the base station can configure hopping patterns of remaining resource blocks to be identical to all $P_{hop}(0)$ or $P_{hop}^{0}(0)$ and $P_{hop}^{1}(0)$.

Embodiment 2

Embodiment 2 corresponds to an embodiment of determining an IMR hopping pattern to make a partial resource block to be dependent on a different resource block. According to Embodiment 1, a hopping pattern is determined in a manner of being independent of each resource block i. On the contrary, according to Embodiment 2, a hopping pattern can be determined in a manner of binding adjacent resource blocks. In the present specification, a set of resource blocks, which is bound up with each other to have a dependent IMR hopping pattern, is called a resource block set.

Embodiment 2-1

Embodiment 2-1 corresponds to an embodiment of determining an IMR hopping pattern, which is dependent on resource blocks constructing a single resource block set. In particular, Embodiment 1-2 determines a hopping pattern dependent on two groups constructing a single IMR, whereas Embodiment 2-1 determines an IMR hopping pattern dependent on a resource block constructing a resource block set.

First of all, a user equipment determines an IMR hopping pattern by applying one of embodiment 1-1 to embodiment 1-3 to an RB (hereinafter called a reference resource block) becoming a reference in a resource block set.

Subsequently, an IMR hopping pattern can be determined on the basis of the reference resource block for the remaining resource blocks in the identical resource block set. The reference resource block can be determined by a resource block including a lowest index in the resource block set. If an IMR hopping pattern of the reference resource block is determined as $P_{hop}^{j}$ or $P_{hop}$, a user equipment determines an IMR hopping pattern of the remaining resource block i existing in an identical resource block set using Formula 16 or 17 in the following. Subsequently, the user equipment measures interference from a corresponding IMR resource element.

Similarly, a base station determines an IMR hopping pattern by applying one of embodiment 1-1 to embodiment 1-3 to a reference resource block i. Subsequently, the base station determines an IMR hopping pattern of the remaining resource block i existing in an identical resource block set using Formula 16 or 17 in the following. Subsequently, the base station performs muting or transmits data in a corresponding IMR resource element.

$$P_{hop}^{j}(i)=(P_{hop}^{j}+\Delta(i)) \mod R$$ [Formula 16]

In Formula 16, i indicates a resource block index and $P_{hop}^{j}$ indicates a hopping pattern index of a $(j+1)^{th}$ group constructing a single IMR in a reference resource block. A constant number k is configured by either 1 or 2. A constant number R means the number of available hopping patterns and the R is set to 6. Δ(i) corresponds to an offset value applied to an $i^{th}$ RB and a base station can designate the Δ(i) to a user equipment via upper layer signaling such as RRC signaling and the like. The Δ(i) can be simply configured as Δ(i)=i.

$$P_{hop}(i)=(P_{hop}+\Delta(i)) \mod R$$ [Formula 17]

In Formula 17, i indicates a resource block index and $P_{hop}$ indicates a hopping pattern index for a single IMR in a reference resource block. A constant number R means the number of available hopping patterns and the R is set to 36. $\Delta(i)$ corresponds to an offset value applied to an $i^{th}$ resource block and a base station can designate the $\Delta(i)$ to a user equipment via upper layer signaling such as RRC signaling and the like. The $\Delta(i)$ can be simply configured as $\Delta(i)=i$. In particular, Formula 17 corresponds to an embodiment of determining hopping patterns of two groups constructing a single IMR at the same time.

Embodiment 2-2

Embodiment 2-2 corresponds to an embodiment of simultaneously determining an IMR hopping pattern for resource blocks constructing a single resource block set. In particular, it is able to determine a hopping pattern of resource blocks constructing a resource block set at the same time using a hopping pattern generator generating random numbers of a range relatively bigger than a range of the aforementioned embodiment 2-1.

Since a number of cases selecting 2 resource elements of a $k^{th}$ group in the Y number of resource blocks constructing a resource block set corresponds to a total $6^M$, a user equipment and a base station can determine an IMR hopping pattern of the Y number of resource blocks constructing the resource block set at the same time by setting an R value to $6^M$ in Formula 13.

Or, similar to Embodiment 1-3, in case of determining an IMR resource element of two groups constructing a single IMR at the same time, since a number of cases selecting 4 resource elements from the M number of resource blocks corresponds to a total $36^M$, a user equipment and a base station can determine an IMR hopping pattern of the Y number of resource blocks constructing the resource block set at the same time by setting an R value to $36^M$ in Formula 15.

Meanwhile, in order to reduce implementation complexity of the embodiment 2, a user equipment and a base station may calculate a hopping pattern in response to a single resource block set. Subsequently, the user equipment and the base station can configure a hopping pattern of the remaining resource block set to be identical to the hopping pattern of the calculated resource block set.

Embodiment 3

According to the aforementioned Embodiment 1 or the Embodiment 2, in case of determining an IMR hopping pattern, 6 combinations selecting 2 resource elements from a single group are considered. Yet, implementation complexity can be reduced by using a part of the 6 combinations as a hopping pattern.

For instance, in FIG. 10, 2 resource elements positioned at an identical frequency or an identical OFDM symbol among 4 resource elements constructing a single group except 2 resource element capable of being diagonally selected can be determined as a hopping pattern. In this case, a user equipment and a base station may use a hopping pattern of 4 types only for a single group. Hence, while using the aforementioned Formula 13, 14 and 16 as it is, an R value is set to 4 instead of 6. And, while using the aforementioned Formula 15 and 17 as it is, the R value is set to 16 instead of 36.

As a different example, in FIG. 10, 2 resource elements capable of being configured as 2-port CSI-RS can be determined as a hopping pattern. In this case, a user equipment and a base station may use a hopping pattern of 2 types for a single group. Hence, while using the aforementioned Formula 13, 14 and 16 as it is, an R value is set to 2 instead of 6. And, while using the aforementioned Formula 15 and 17 as it is, the R value is set to 4 instead of 36.

In the following, a method of determining an initial value of a pseudo-random sequence generator according to the present invention is explained.

Initialization of a second m-sequence of a pseudo-random sequence generator can be determined by such a function as the aforementioned group index j, a cell serving cell identifier (ID) $N_{ID}^{cell}$, a subframe number $n_f$, a hopping parameter X and the like. The aforementioned values used for initialization configuration can be delivered to a user equipment via upper layer signaling such as RRC signaling and the like. The serving cell identifier (ID) $N_{ID}^{cell}$ has an integer value ranging from a value equal to or greater than 0 to a value equal to or less than 503. An index j of a group constructing a single IMR has a value of 0 or 1. A base station may use the serving cell identifier (ID) $N_{ID}^{cell}$ as a hopping parameter without setting a separate hopping parameter X to a user equipment. The aforementioned method can be efficient when a single IMR is set to each base station.

For instance, the second m-sequence initialization of the pseudo-random sequence generator can be performed according to Formula 18 in the following.

$$c_{init}=j\cdot 2^9+N_{ID}^{cell} \qquad \text{[Formula 18]}$$

In Formula 18, since a subframe number of is not involved in the initialization, an IMR hopping pattern does not change according to a subframe.

And, the second m-sequence initialization of the pseudo-random sequence generator can be performed according to Formula 19 in the following.

$$c_{init}=(n_f \bmod L)\cdot 2^{14}+j\cdot 2^{13}+N_{ID}^{cell} \qquad \text{[Formula 19]}$$

According to Formula 19, a subframe number of is used as a variable for the initialization by modifying Formula 18. L corresponds to a value determining a subframe duty cycle of IMR hopping and an IMR hopping pattern is repeated in an L subframe unit.

And, in Formula 19, an exponent of 2 can be determined by Formula 20 in the following.

$$c_{init}=(n_f \bmod L)\cdot 2^{10}+j\cdot 2^9+N_{ID}^{cell} \qquad \text{[Formula 20]}$$

And, the second m-sequence initialization of the pseudo-random sequence generator can be performed according to Formula 21 in the following.

$$c_{init}=((n_f \bmod L)+1)\cdot(2N_{ID}^{cell}+1)\cdot 2^1+j \qquad \text{[Formula 21]}$$

Formula 21 corresponds to an example of configuring an initialization value using a serving cell identifier $N_{ID}^{cell}$, a group index j and a subframe number $n_f$.

And, an IMR hopping pattern can be generated using a hopping parameter X without using the serving cell identifier $N_{ID}^{cell}$. This method can be efficiently used when a plurality of IMRs are set to each base station. Specifically, the second m-sequence initialization of the pseudo-random sequence generator can be performed according to Formula 22 to 24 in the following.

$$c_{init}=X\cdot 2^1+j \qquad \text{[Formula 22]}$$

$$c_{init}=X\cdot 2^{11}+(n_f \bmod L)\cdot 2^1+j \qquad \text{[Formula 23]}$$

$$c_{init}=((n_f \bmod L)+1)\cdot(2X+1)\cdot 2^1+j \qquad \text{[Formula 24]}$$

Formula 25 to 27 in the following corresponds to an example of obtaining an initialization value by inserting a group index j, a hopping parameter X and a subframe number of to a different equation in the aforementioned Formula 22 to 24. In this case, in Formula 25 and 26, k is determined by a minimum integer satisfying (maximum value of $X<2^k$). In Formula 27, k is determined by a minimum integer satisfying (maximum value of $(2Y+1)*L<2^k$).

$$c_{init}=j \cdot 2^k+X \quad \text{[Formula 25]}$$

$$c_{init}=(n_f \bmod L) \cdot 2^{k+1}+j \cdot 2^k+X \quad \text{[Formula 26]}$$

$$c_{init}=j \cdot 2^k+((n_f \bmod L)+1) \cdot (2X+1) \quad \text{[Formula 27]}$$

For instance, the X can be configured by a scrambling seed value of an NZP CSI-RS belonging to a CSI process to which a corresponding IMR is set thereto. Or, a base station can inform a user equipment of the X in a manner of configuring the X by a unique value possessed by each IMR. In this case, configuration of an identical hopping pattern between IMRs can be prevented by making IMRs different from each other have an X value different from each other. By doing so, IMR collision can be minimized.

Meanwhile, Formula 13 and Formula 15 can be modified into Formula 28 and Formula 29, respectively, in a more simplified form. Although Formula 13 and Formula 15 use a scheme of adding a code of a pseudo-random sequence to an IMR hopping pattern of a resource block i in case of determining a IMR hopping pattern of a resource block i+1, Formula 28 and 29 determines an IMR hopping pattern of each resource block using a code of a pseudo-random sequence only. In the aforementioned embodiments, embodiments based on Formula 13 and Formula 15 can be identically used in a manner of replacing Formula 13 with Formula 28 or replacing Formula 15 with Formula 29. In particular, when the embodiment 1-2 is applied based on Formula 28, $P_{hop}^0(i)$ of Formula 14 is determined using Formula 28. When the embodiment 2-1 is applied based on Formula 28, $P_{hop}^j(i)$ of Formula 16 is determined using Formula 28. When the embodiment 2-1 is applied based on Formula 28, $P_{hop}(i)$ of Formula 18 is determined using Formula 29.

$$P_{hop}^j(i) = \left( \sum_{k=i \cdot N+1}^{i \cdot N+O} c(k) \times 2^{k-(i \cdot N+1)} \right) \bmod R \quad \text{[Formula 28]}$$

$$P_{hop}(i) = \left( \sum_{k=i \cdot N+1}^{i \cdot N+O} c(k) \times 2^{k-(i \cdot N+1)} \right) \bmod R \quad \text{[Formula 29]}$$

Figure 11:
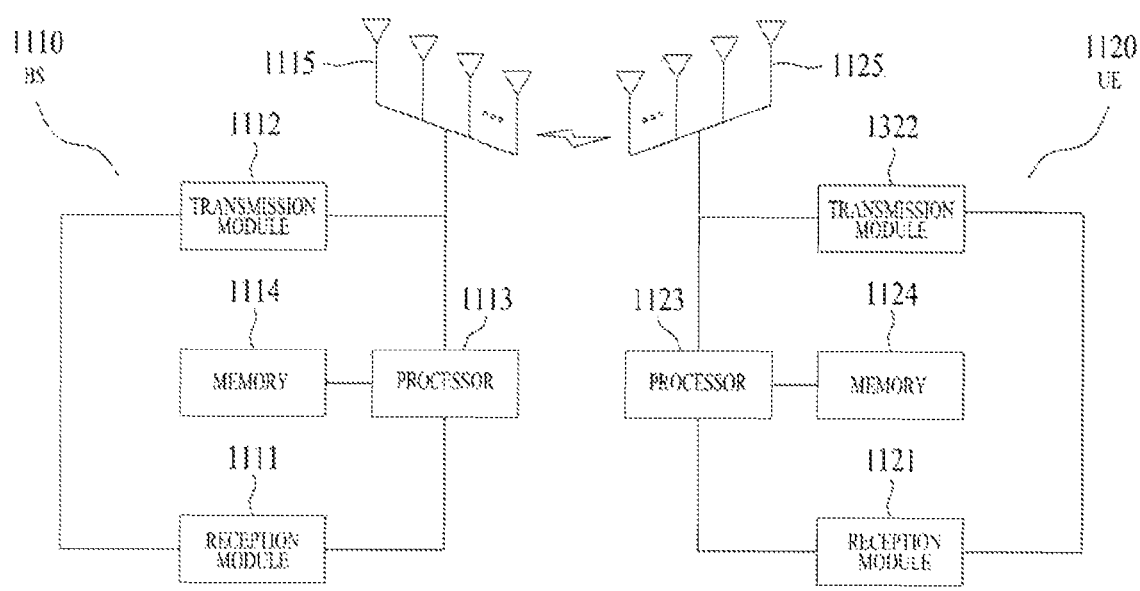
FIG. 11 is a diagram for a configuration of a base station and a user equipment applicable to one embodiment of the present invention.

FIG. 11 is a diagram for a configuration of a base station and a user equipment applicable to one embodiment of the present invention.

If a relay is included in a wireless communication system, communication is performed between a base station and the relay in a backhaul link and communication is performed between the relay and a user equipment in an access link. Hence, the base station and the user equipment shown in the drawing can be replaced with the relay in accordance with a situation.

Referring to FIG. 11, a wireless communication system includes a base station 1110 and a user equipment 1120. The base station 1110 includes a processor 1113, a memory 1114 and a radio frequency (RF) unit 1111/1312. The processor 1113 can be configured to implement a procedure and/or methods proposed by the present invention. The memory 1114 is connected with the processor 1113 and stores various information associated with operations of the processor 1113. The RF unit 1116 is connected with the processor 1113 and transmits and/or receives a radio signal. The user equipment 1120 includes a processor 1123, a memory 1124 and a radio frequency (RF) unit 1121/1322. The processor 1123 can be configured to implement a procedure and/or methods proposed by the present invention. The memory 1124 is connected with the processor 1123 and stores various information associated with operations of the processor 1123. The RF unit 1121/1322 is connected with the processor 1123 and transmits and/or receives a radio signal. The base station 1110 and/or the user equipment 1120 can include a single antenna or multiple antennas. The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'base station' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The present invention can be specified into a different prescribed form within a scope not deviating from a principle and an essential characteristics of the present invention. Hence, the above-mentioned detail explanation of the present invention should be considered as exemplary rather than limitative in all aspects. The scope of the present invention should be determined by rational interpretation of attached claims and all changes within an equivalent scope of the present invention are included in the scope of the present invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The present invention can be used for such a wireless communication device as a user equipment, a relay, a base station and the like.

What is claimed is:

1. A method of measuring interference of a neighboring base station, by a user equipment in a wireless communication system, the method comprising:
   determining a first resource group and a second resource group respectively containing resource elements of X number of zero power channel state information reference signals for interference measurement, wherein X is a positive integer;
   selecting Y (Y≤X) number of resource elements from the first resource group according to a first index and selecting Y number of resource elements from the second resource group according to a second index, wherein Y is a positive integer;
   measuring the interference of the neighboring base station based on a position of the 2Y number of selected resource elements on which muting is performed by a serving base station of the user equipment; and
   transmitting information about the measured interference to the serving base station,
   wherein the first index is determined by a first formula:

$$P_{hop}^{j}(i) = \left( P_{hop}^{j}(i-1) + \left( \sum_{k=i\cdot N+1}^{i\cdot N+O} c(k) \times 2^{k-(i\cdot N+1)} \right) \bmod(R-1) + 1 \right) \bmod R,$$

where 'i' denotes a resource block index, 'j' denotes a resource group index, 'c(k)' denotes a pseudo-random sequence, $P_{hop}^{j}$ denotes a hopping pattern index of a (j+1) group, 'mod' denotes a modulo operation, and 'R', 'N', and 'O' are predetermined positive integers respectively.

2. The method of claim 1, wherein X is 4, Y is 2, R is 6, N is 10, and O is 9.

3. The method of claim 1,
   wherein X is 4, Y is 2, and
   wherein the second index is determined by a second formula:

$$P_{hop}^{1}(i) = (P_{hop}^{0}(i)+\Delta) \bmod R,$$

where R is 6, N is 10, O is 9, and Δ corresponds to an offset value.

4. The method of claim 1, wherein X is 4, Y is 2, R is 36, N is 10, and O is 9.

5. A method of a base station supporting interference measurement, in a wireless communication system, the method comprising:
   determining a first resource group and a second resource group respectively containing resource elements of X number of zero power channel state information reference signals for interference measurement, wherein X is a positive integer;
   selecting Y (Y≤X) number of resource elements from the first resource group according to a first index and selecting Y number of resource elements from the second resource group according to a second index, wherein Y is a positive integer; and
   performing muting in the 2Y number of selected resource elements on which interference of a neighboring station is measured by a user equipment served by the base station,
   wherein the first index is determined by a first formula:

$$P_{hop}^{j}(i) = \left( P_{hop}^{j}(i-1) + \left( \sum_{k=i\cdot N+1}^{i\cdot N+O} c(k) \times 2^{k-(i\cdot N+1)} \right) \bmod(R-1) + 1 \right) \bmod R,$$

where 'i' denotes a resource block index, 'j' denotes a resource group index, 'c(k)' denotes a pseudo-random sequence, $P_{hop}^{j}$ denotes a hopping pattern index of a (j+1) group, 'mod' denotes a modulo operation, and 'R', 'N', and 'O' are predetermined positive integers respectively.

6. The method of claim 5, wherein X is 4, Y is 2, R is 6, N is 10, and O is 9.

7. The method of claim 5,
   wherein X is 4, Y is 2, and
   wherein the second index is determined by a second formula:

$$P_{hop}^{1}(i) = (P_{hop}^{0}(i)+\Delta) \bmod R,$$

where R is 6, N is 10, O is 9, and Δ corresponds to an offset value.

8. The method of claim 5, wherein X is 4, Y is 2, R is 36, N is 10, and O is 9.

9. The method of claim 5, further comprising:
   receiving information about the measured interference from the user equipment.

10. A user equipment configured to measure interference of a neighboring base station in a wireless communication system, the user equipment comprising:
    a transceiver;
    an antenna connected to the transceiver; and
    a processor connected to the transceiver and configured to:
      determine a first resource group and a second resource group respectively containing resource elements of X number of zero power channel state information reference signals for interference measurement, wherein X is a positive integer;
      select Y (Y≤X) number of resource elements from the first resource group according to a first index and selecting Y number of resource elements from the second resource group according to a second index, wherein Y is a positive integer;
      measure the interference of the neighboring base station based on a position of the 2Y number of selected resource elements on which muting is performed by a serving base station of the user equipment; and transmit information about the measured interference to the serving base station, wherein the first index is determined by a first formula:

$$P_{hop}(i) = \left(P_{hop}(i-1) + \left(\sum_{k=i\cdot N+1}^{i\cdot N+O} c(k) \times 2^{k-(i\cdot N+1)}\right) \bmod(R-1) + 1\right) \bmod R,$$

where 'i' denotes a resource block index, 'j' denotes a resource group index, 'c(k)' denotes a pseudo-random sequence, $P_{hop}^{j}$ denotes a hopping pattern index of a (j+1) group, 'mod' denotes a modulo operation, and 'R', 'N', and 'O' are predetermined positive integers respectively.

* * * * *